United States Patent [19]

Takagi

[11] Patent Number: 5,451,827
[45] Date of Patent: Sep. 19, 1995

[54] ULTRASONIC MOTOR HAVING A SUPPORTING MEMBER

[75] Inventor: Tadao Takagi, Yokohama, Japan

[73] Assignee: Nikon Corporation, Tokyo, Japan

[21] Appl. No.: 208,854

[22] Filed: Mar. 11, 1994

[30] Foreign Application Priority Data

Mar. 12, 1993 [JP] Japan .................................. 5-078723

[51] Int. Cl.⁶ .................................................. H01L 41/08
[52] U.S. Cl. ..................................... 310/323; 310/358; 310/359; 310/367; 310/328
[58] Field of Search ................ 310/323, 328, 358, 359, 310/366, 367

[56] References Cited

U.S. PATENT DOCUMENTS

| | | | |
|---|---|---|---|
| 4,678,956 | 7/1987 | Izukawa et al. | 310/323 |
| 4,871,937 | 10/1989 | Kawai | 310/323 |
| 5,025,186 | 6/1991 | Tsukada | 310/323 |
| 5,066,884 | 11/1991 | Takagi et al. | 310/323 |
| 5,079,470 | 1/1992 | Kasuga et al. | 310/323 |
| 5,172,023 | 12/1992 | Kawai et al. | 310/323 |

FOREIGN PATENT DOCUMENTS

| | | | |
|---|---|---|---|
| 0180582 | 8/1986 | Japan | 310/323 |
| 022672 | 9/1989 | Japan | 310/323 |
| 0228272 | 9/1990 | Japan | 310/323 |

*Primary Examiner*—Mark O. Budd

[57] ABSTRACT

An ultraso motor with a stator uniformly made of a material that is capable of converting electrical energy to mechanical energy, by the performance of a specified process. The stator includes a first part having corresponding electrodes for applying a signal to the first part, and a second part, uniformly configured to the first part, having areas adjacent to the first part where the material does not exist. A support member supports the stator at the areas which are devoid of the material. A movable clement contacts the second part of the stator and is driven by a progressive oscillatory wave that is generated in the second part by a frequency voltage applied to the electrodes.

20 Claims, 7 Drawing Sheets

ULTRASONIC MOTOR HAVING A SUPPORTING MEMBER

BACKGROUND OF THE INVENTION

1. Field of the Invention

The present invention relates to an ultrasonic motor and, more particularly, to an ultrasonic motor which makes use of ultrasonic vibration to drive a moveable element.

2. Description of the Related Art

Japanese Patent Publication No. 1-17353 describes an ultrasonic motor in which a stator comprises an elastic body made of metal and an electromechanical conversion element, comprising a piezoelectric body, is attached by adhesion to the elastic body. However, with regard to this type of conventional ultrasonic motor, due to the adhesion of different types of materials, many problems have been caused, such as fluctuations in performance relative to temperature changes, and inferior weatherproofing of the affixed parts. Other drawbacks, such as increases in cost, are due to the use of a plurality of pieces of different types of material.

SUMMARY OF THE INVENTION

Accordingly, an object of the present invention is to provide an ultrasonic motor which resolves problems such as variations in the performance of the stator relative to temperature changes, inferior weatherproofing of the affixed parts, and high cost, and which further possesses a support member which does not impair the performance of the stator.

It is a further object to provide a motor having a stator which is uniformly made of material that can convert electrical energy to mechanical energy, without having an adhesive layer between parts of the stator.

It is still a further object to provide a motor having a support of the stator in such a way that the performance of the stator is not impaired.

The foregoing objects of the present invention are achieved by providing an ultrasonic motor comprising a stator which is made up of a material that is capable of converting electrical energy into mechanical energy, by the performance of a specified processing. The stator includes a first part which executes the specified processing and has electrodes on both sides, and a second part which possesses at least some parts where the material does not exist. The ultrasonic motor further comprises a support member which supports the stator by making use of the parts of the second part of the stator which are devoid of the material and a movable element which contacts the second part of the stator, and which is driven by a progressive oscillatory wave that is generated in the second part by a frequency voltage applied to the electrodes.

In order to achieve the above objects, the material which converts electrical energy into mechanical energy may be an electrolytic material, and the specified processing may be polarization processing.

In addition, the parts of the second part, which are devoid of the material, may be openings.

With regard to the present invention, since the first part (drive part) and second part (action part) of the stator are configured in an integrated whole by the identical material in the above manner, it is possible to prevent variations in performance relative to temperature changes and poor weatherproofing of the affixed parts, and it is also possible to lower the costs of producing such an ultrasonic motor.

Moreover, since the parts which are devoid of the material and which are provided between the first part (drive part) and the second part (action part) are supported, it is possible to conduct support in such a way that the performance of the stator is not impaired.

Additional objects and advantages of the present invention will be set forth in part in the description which follows, and, in part, will be obvious from the description, or may be learned by practice of the present invention.

BRIEF DESCRIPTION OF THE DRAWINGS

Reference will now be made in detail to the present embodiments of the present invention, examples of which are illustrated in the accompanying drawings, wherein like reference numerals refer to like elements throughout.

DESCRIPTION OF THE PREFERRED EMBODIMENTS

FIGS. 1 through 5 show a first embodiment of an ultrasonic motor of the present invention.

Figure 1:
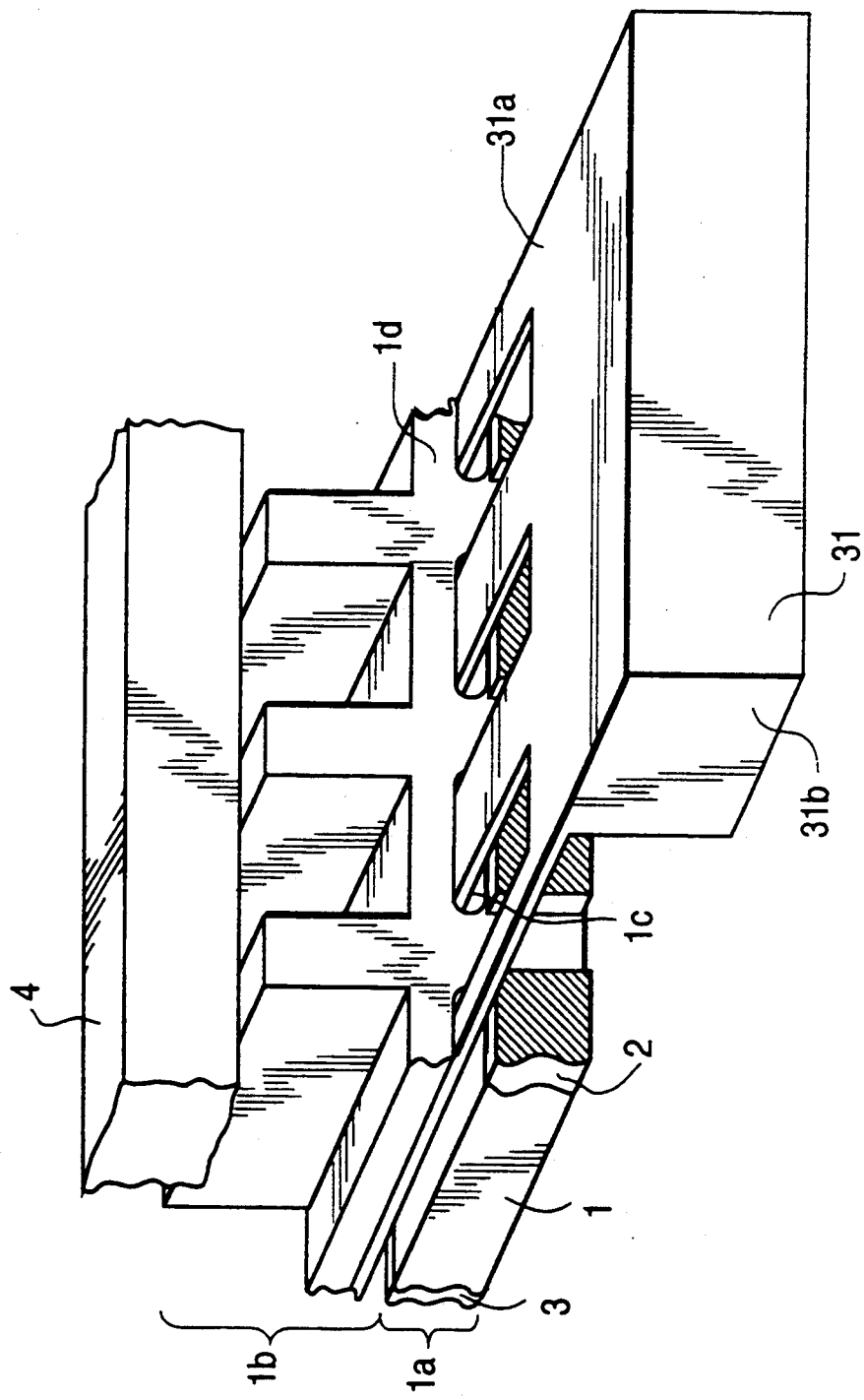
FIG. 1 is a drawing which shows a first embodiment (linear type) of an ultrasonic motor of the present invention.
Figure 2:
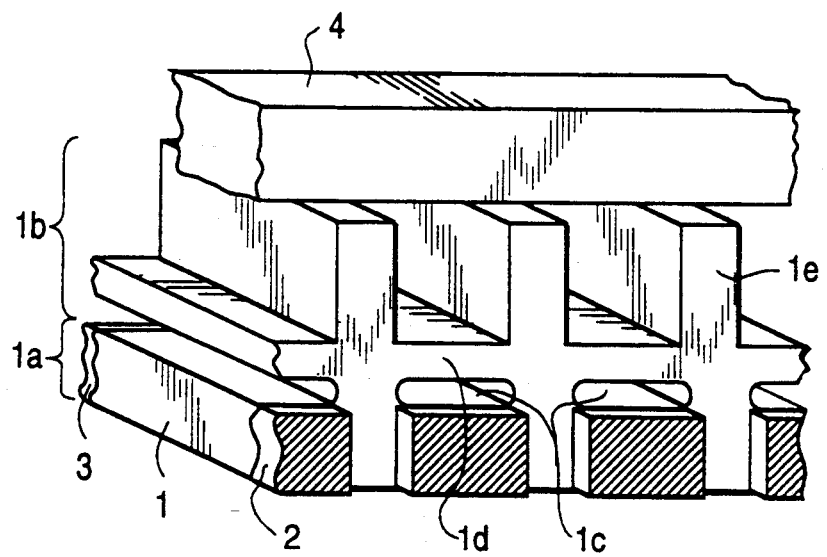
FIG. 2 is a developed perspective view of the ultrasonic motor of the first embodiment.

As shown in FIGS. 1 and 2, a stator 1 is integrally formed in its entirety by a uniform material. The material of the stator 1 is capable of converting electrical energy to mechanical energy by applying "specified processing." In the present embodiment, the material used is PZT (plumbozirconate titanate). Accordingly, the specified processing here means polarization processing.

The stator 1 has an electrode group 2 and an electrode 3 which perform polarization processing, and which are provided on both sides at the bottom part of the stator 1 at right angles to the face of the stator which contacts a movable element 4 (see FIG. 1). This part of the electrode group 2 and electrode 3 is called a first part 1a. A second part 1b having parts 1d and 1e is provided with openings 1c which are devoid of PZT. The form of the openings 1c may be rectangular or oval.

Frequency voltage is applied between the electrode group 2 and the electrode 3, with the result being that the first part 1a is expanded and contracted in the lengthwise direction, that is, in the direction of arrangement of the electrode group 2. As shown in FIG. 2, when this first part 1a is expanded and contracted, a progressive oscillatory wave is generated in the comb tooth part 1e supported on the part 1d at the upper side of the openings 1c.

In FIG. 2, the cross-sectional shape in the lengthwise direction of the stator 1 (the cross-sectional shape including the comb tooth part 1e) is approximately square, but it may also be rectangular, trapezoidal, or circular.

The movable element 4 contacts the second part 1b of the stator 1, and is driven by the generated progressive oscillatory wave. Since the driving of the movable element 4 by this progressive oscillatory wave is disclosed, for example, in Japanese Patent Publication No. 1-17353, a detailed explanation is omitted here.

As shown in FIG. 1, a support member 31 is provided in the stator 1. The support parts 31a of the support member 31 are inserted into the openings 1c of the stator 1 which are devoid of PZT. Since the support parts 31a are designed to have low rigidity, it is possible to attenuate the vibration of the stator 1 between the fixed parts 31b. The support parts 31a contact the stator 1 at the side part 1d in the upper portion of the holes 1c of the stator 1 and since the upper side part 1d is the fulcrum and is the part where the vibration is smallest in the stator 1, it is most suited to provide support.

Figure 3B:
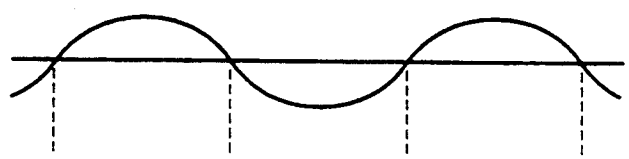
FIG. 3(B) is a diagram explaining the relation of the electrode arrangement and the wave length of the progressive oscillatory wave according to the first embodiment of the present invention.
Figure 3A:
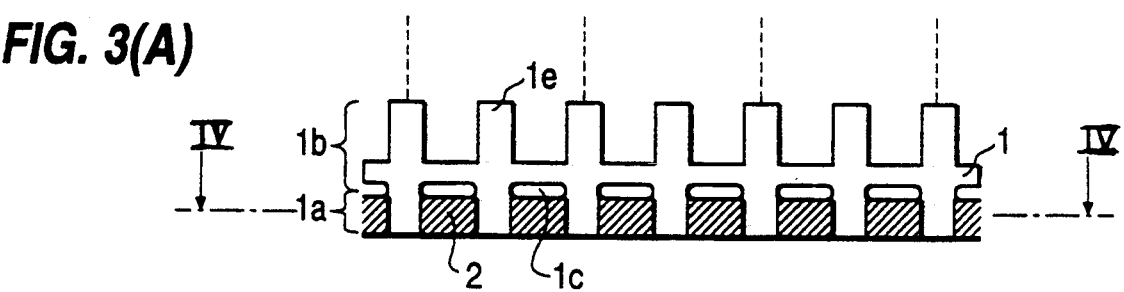
FIG. 3(A) is a front view of the stator for the ultrasonic motor of the first embodiment of the present invention.

FIGS. 3(A) and 3(B) are drawings designed to explain the stator of the first embodiment of the ultrasonic motor of the present invention.

FIG. 3(A) is a frontal view of the stator and FIG. 3(B) is a drawing which explains the relation of the electrode arrangement and the wave length of the progressive oscillatory wave, and shows that four electrode elements correspond to one wave length.

Figure 4:
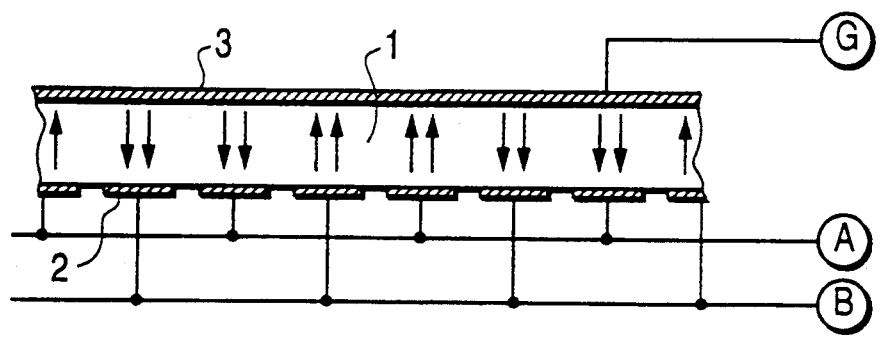
FIG. 4 is a cross-sectional view of the stator of FIG. 3(A), taken along line IV—IV in FIG. 3(A).

FIG. 4 is a drawing which explains the relation of the polarization arrangement of the stator 1 and the method of application of the frequency voltage, and is a cross-sectional view taken along line IV—IV of FIG. 3(A).

With regard to the application of a frequency voltage, as shown in FIG. 4, the A phase voltage and B phase voltage are spatially applied in an alternating manner via the electrode group 2. The A phase voltage and B phase voltage are offset by a phase of $\pi/2$. With regard to the polarization arrangement, each of two electrode elements are polarized in the same direction as a set, and the sets are alternately arranged in opposite directions. The electrode 3 is a common electrode.

Since the principle of generation of the progressive oscillatory wave resulting from this configuration has been disclosed by Japanese Patent Publication No. 60-245482, a detailed explanation is omitted here.

Figure 5:
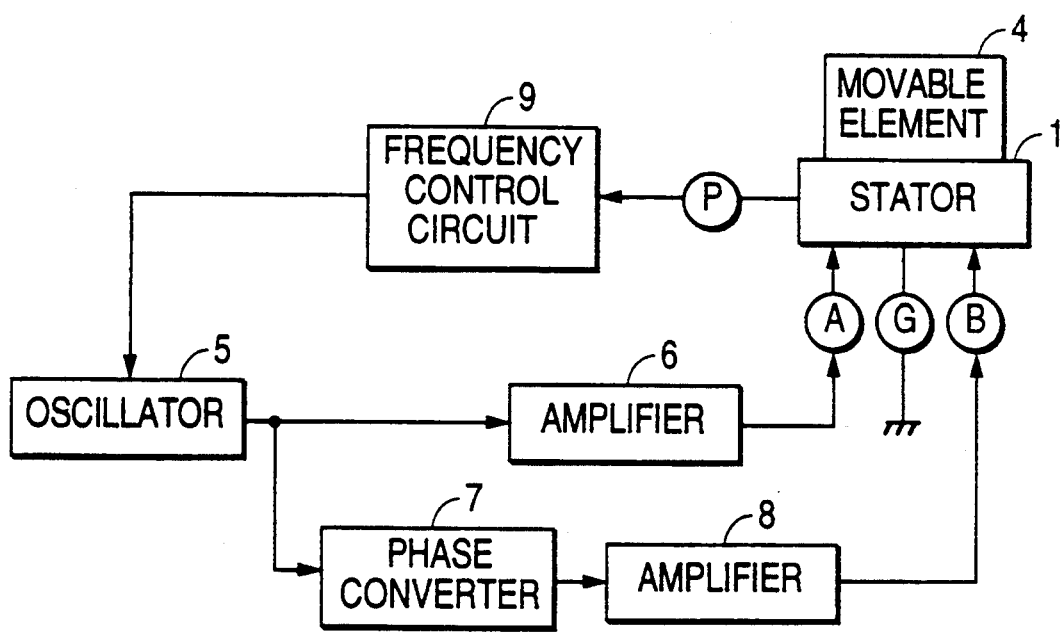
FIG. 5 is a block diagram which shows the control circuit of the first embodiment of the present invention.

FIG. 5 is a block diagram which shows the control circuit of the first embodiment of the ultrasonic motor of the present invention. The frequency voltage (generally, in the 20 KHz to 200 KHz ultrasonic wave band), which is generated by the oscillator 5, is amplified by the amplifier 6, and is input to the stator 1 from terminal A as an A phase voltage.

The frequency voltage generated from the oscillator 5 branches and is also input to the phase converter 7. Here, it is phase shifted by $\pi/2$ only, and after being amplified by the amplifier 8, it is input to the stator 1 from terminal B as a B phase voltage.

Terminal P receives signals which detect the oscillation condition of the ultrasonic motor, i.e., the movable element 4 and stator 1 or the stator 1. The frequency control circuit 9, connected to terminal P, controls the frequency of the oscillator 5 according to these signals.

Figure 6:
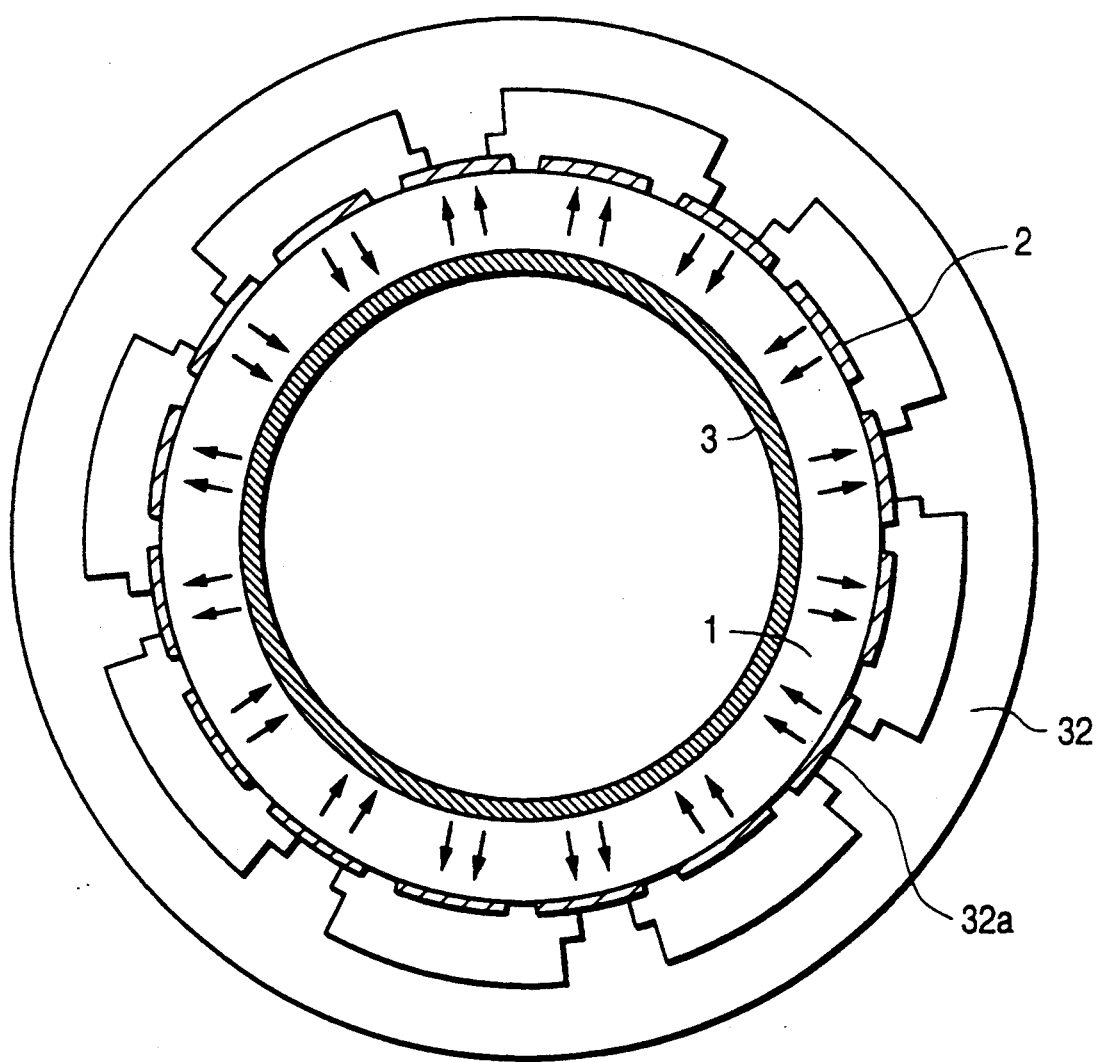
FIG. 6 is a drawing which shows a second embodiment (annular type) of an ultrasonic motor of the present invention.
Figure 7:
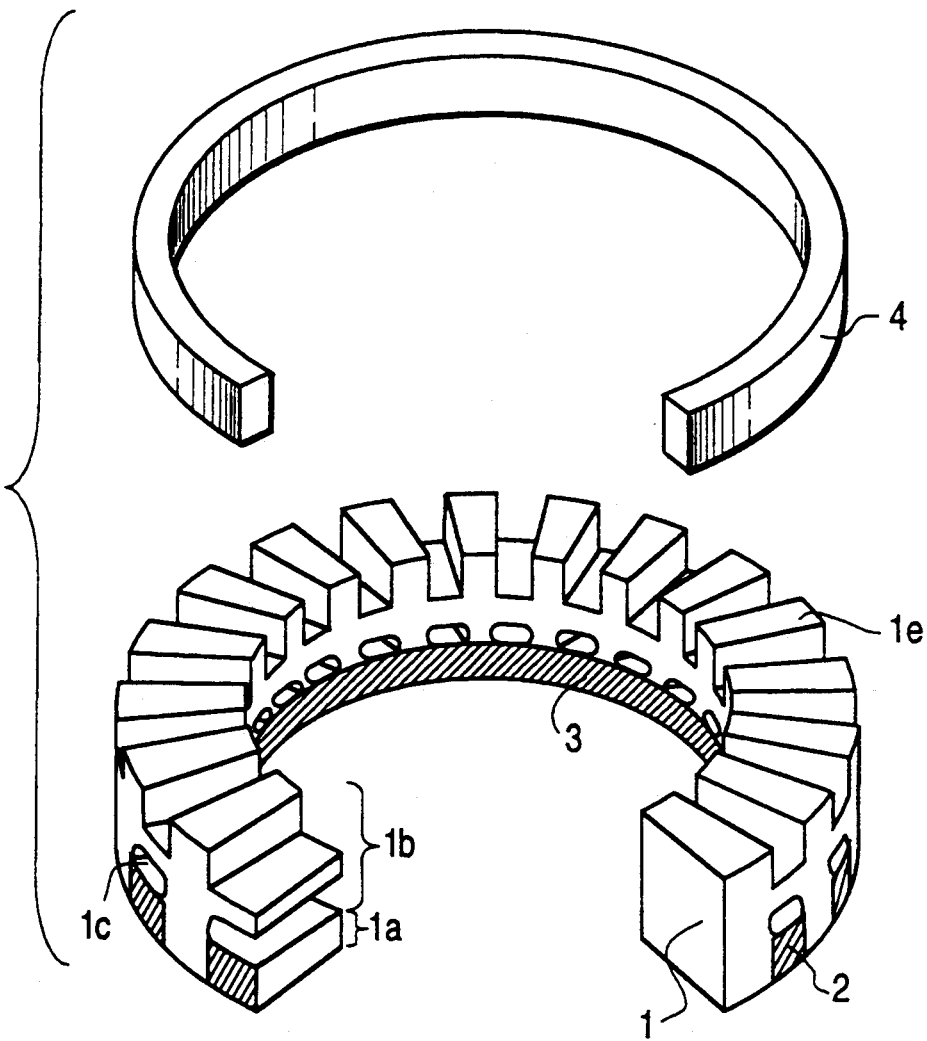
FIG. 7 is a developed perspective view which shows the stator and the movable element of the second embodiment.
Figure 8:
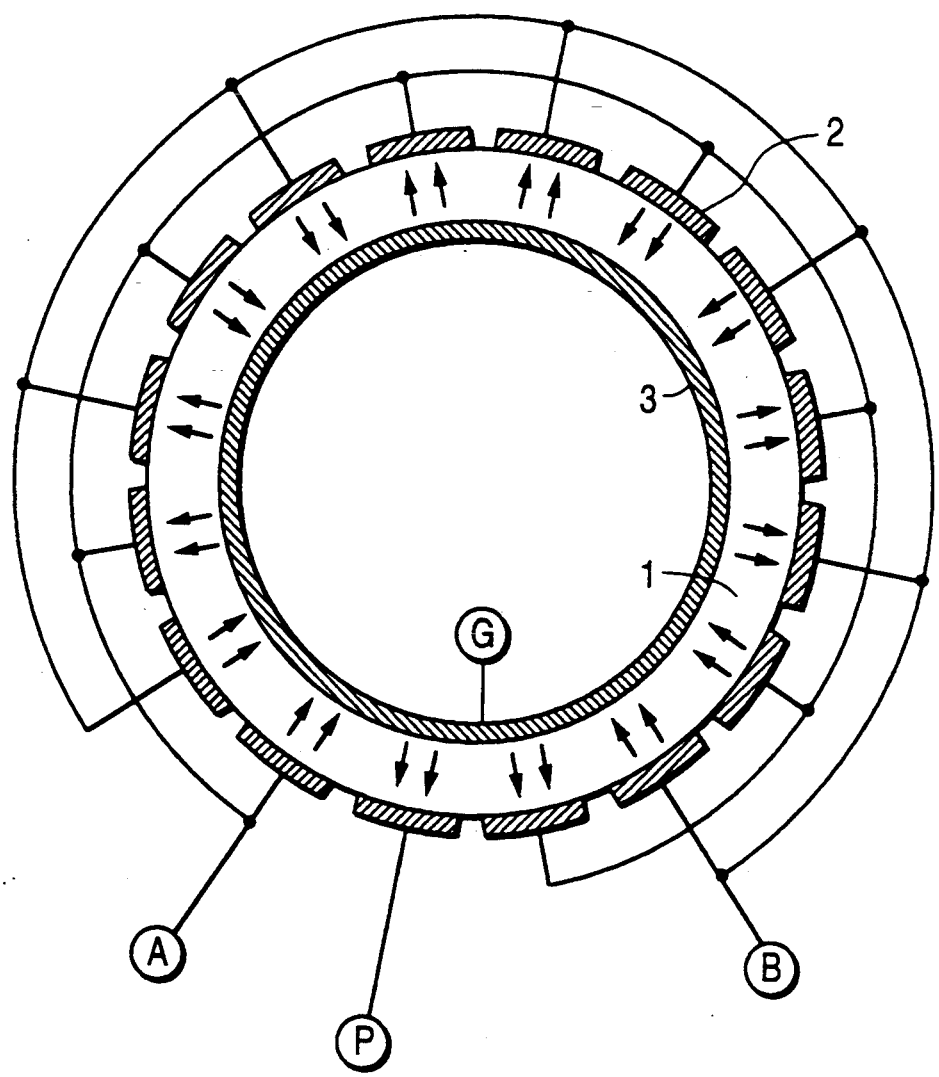
FIG. 8 is a drawing which shows the annular type stator of the second embodiment.

FIGS. 6 through 8 are drawings which show a second embodiment (the case where the stator is annular in shape) of the ultrasonic motor of the present invention. In each of these figures, parts which perform the same functions as in the first embodiment are given the same reference numerals.

In the second embodiment, the stator 1 has an annular shape, as shown in FIG. 6. With regard to this stator 1, from the standpoint of manufacture, as shown in FIG. 7, one may have a design, as shown in FIG. 7, in which the width in the horizontal rectangular direction of the comb tooth part 1e widens as it extends outwardly in the radial direction, or one may have a design in which the width of the grooves between the adjacent comb tooth parts 1e widens as it extends outwardly in the radial direction. With regard to the hole widths of the openings 1c, it is acceptable that they widen as they extend outwardly in the radial direction.

With regard to FIG. 7, the width of the electrodes 2 and 3 are not drawn in an exaggerated manner as in FIG. 2.

In the second embodiment, as shown in FIG. 6, an annular shaped support member 32 is provided in the stator 1. Note that FIG. 6 is a drawing which is viewed from underneath the ultrasonic motor (the side without the movable element 4). As in the first embodiment, the support parts 32a of the support member 32 are inserted into the openings 1c of the ultrasonic motor (see FIG. 7) which are at least devoid of PZT. Since the support parts 32a are designed to have low rigidity, the vibration of the stator 1 can be attenuated between the fixed parts (not illustrated).

FIG. 8 is a cross-sectional view of the first part 1a of FIG. 7. Since the principle of generation of the progressive oscillatory wave based on this configuration has also been disclosed in Japanese Patent Publication No. 60-245482, its detailed explanation is omitted here.

Figure 9B:
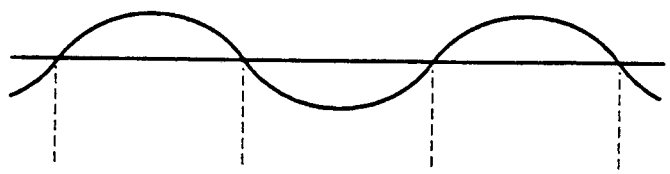
FIG. 9(B) is a drawing explaining the relation of the electrode arrangement and the wave length of the progressive oscillatory wave, according to FIG. 9(A).
Figure 9A:
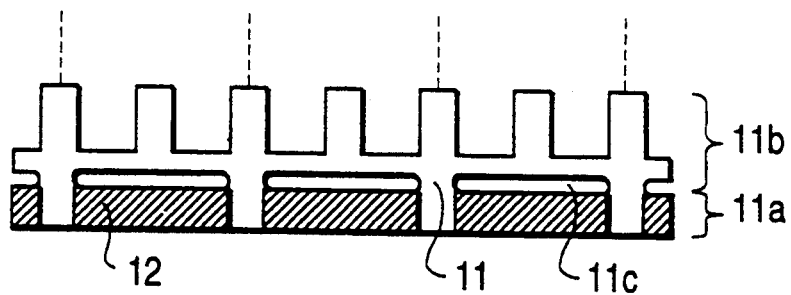
FIG. 9(A) is a frontal view which shows the stator of a third embodiment of the ultrasonic motor of the present invention.

FIG. 9(A) is a frontal view which shows the stator of a third embodiment of the present invention. Since the relation of the stator with the movable element 4 is the same as in the first embodiment, it is not shown in the drawing. FIG. 9(B) is a drawing which explains the relation of the electrode arrangement and the wave length of the progressive oscillatory wave, and shows that two electrode elements correspond to one wave length.

The difference with the first embodiment is that two openings 11c of the second part 11b, which are devoid of PZT, as well as two elements of the electrode group 12, fall within one wave length.

Figure 10B:
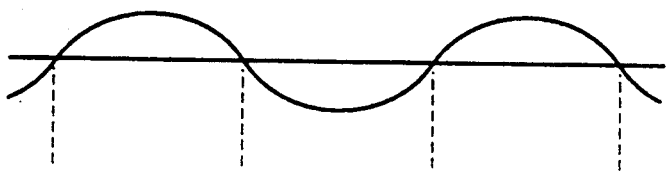
FIG. 10(B) is a drawing explaining the relation of the electrode arrangement and the wave length of the progressive oscillatory wave according to FIG. 10(A).
Figure 10A:
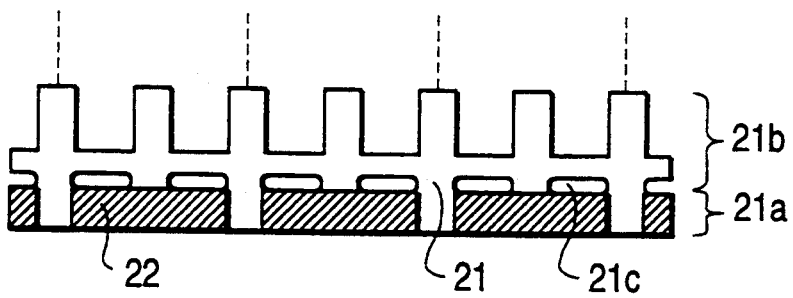
FIG. 10(A) is a frontal view which shows the stator of a fourth embodiment of the ultrasonic motor of the present invention.

FIG. 10(A) is a frontal view which shows the stator of a fourth embodiment of the ultrasonic motor of the present invention. Since the relation of the stator with the movable element 4 is the same as in the first embodiment, it is not shown in the drawing. FIG. 10(B) is a drawing which explains the relation of the electrode arrangement and the wave length of the progressive oscillatory wave, and shows that two electrode elements correspond to one wave length.

The difference with the first embodiment is that the electrode group 22 has two elements in one wave length while four openings 21c fall within one wave length.

With regard to the third and fourth embodiments, there is the advantage that the relation of the electrode arrangement and the wave length of the progressive oscillatory wave is the same type as is disclosed in FIGS. 10 through 13 of Japanese Patent Publication No. 60-245482 and that the wiring of the A phase and the B phase can be respectively arranged.

The invention is not limited to the specific embodiments explained above. There are various different forms and changes which are possible, and these are included in the present invention.

As long as the material of stator 1 is capable of converting electrical energy to mechanical energy by the performance of the specified processing, the invention is not limited to using PZT (plumbozirconate titanate), such as is disclosed in the first embodiment. For example, one may also use other piezoelectric materials, electrostrictive materials, and magnetostrictive materials.

Moreover, with regard to the parts 1c of the second part which are at least devoid of the same material as the stator 1, the invention is not limited to the openings disclosed in the first through fourth embodiments. For example, these parts 1c can be composed of metal of low rigidity, resin, inorganic material, etc.

According to the present invention as explained above, since the first part (drive part) and second part (action part) of the stator are integrally composed from the same material, variations in performance relative to temperature changes and inferior weatherproofing of the affixed parts can be prevented. In addition, it is also possible to lower costs.

Moreover, since the parts which are provided between the first part (drive part) and second part (action part) and which are devoid of the material are supported, it is possible to conduct support in such a way that the performance of the stator is not impaired. Furthermore, since adhesion layers do not exist in the ultrasonic motor between different types of materials, use in a high temperature environment is also possible.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An ultrasonic motor comprising:
    a stator made of a material capable of converting electrical energy to mechanical energy by a specified processing, the stator including
    a first part, with first and second sides having corresponding electrodes on said first and second sides which receive a frequency voltage, said first part expanding and contracting in response to the frequency voltage, and
    a second part, having projections and openings, the second part being adjacent to said first part and generating a progressive oscillatory wave in response to the expanding and contracting of said first part;
    a moving element, in contact with said projections of said second part, which is driven by the progressive oscillatory wave in the second part; and
    a support member, having a portion inserted into at least one of said openings, which attenuates vibration of said stator.

2. The motor as claimed in claim 1, wherein said material is a piezoelectric material and the specified processing is a polarization process.

3. The motor as claimed in claim 1, further comprising ditches formed by said projections, which are different from said openings.

4. The motor as claimed in claim 1, wherein said projections are comb tooth parts.

5. The motor as claimed in claim 1, wherein said stator and said moving element have annular configurations, the first side being an inner circumference, and the second side being an outer circumference, the corresponding electrode on the inner circumference being a shared electrode extending along the entire inner circumference at a bottom portion of said stator, the corresponding electrode on the outer circumference being electrodes respectively associated with said openings at the bottom portion of said stator.

6. The motor as claimed in claim 1, wherein the corresponding electrode on the first side is a shared electrode extending along the entire first side at a bottom portion of said stator, the corresponding electrode on the second side are electrodes respectively associated with said openings at the bottom portion of said stator.

7. The motor as claimed in claim 1, wherein the corresponding electrode on the first side is a shared electrode extending along the entire first side at a bottom portion of said stator, a set of two openings being respectively associated with one of the corresponding electrodes on the second side, each of the electrodes on the second side being at the bottom portion of said stator.

8. The motor as claimed in claim 5, wherein four electrodes on the outer circumference correspond to one wave length of the progressive oscillatory wave.

9. The motor as claimed in claim 5, wherein two electrodes on the outer circumference correspond to one wave length of the progressive oscillatory wave.

10. The motor as claimed in claim 1, wherein said second part further comprises:
    an upper side part having a top surface and a bottom surface, and a width the same as the distance between the first and second sides, the lower surface of the upper side part being the top boundary of said openings; and
    comb tooth parts extending perpendicularly from the top surface of the upper side part to the moving element.

11. The motor as claimed in claim 5, wherein said second part further comprises:
    an upper side part having a top surface and a bottom surface, and a width the same as the distance between the first and second sides, the lower surface of the upper side part being the top boundary of each of said plurality of openings; and comb tooth parts extending perpendicularly from the top surface of the upper side part to the moving element.

12. The motor as claimed in claim 11, wherein a circumferential width of said comb tooth parts increases in relation to a distance from the center of said stator having the annular configuration.

13. The motor as claimed in claim 1, wherein said material is an electrostrictive material.

14. A motor comprising:
   a stator, made of a material that can convert electrical energy to mechanical energy, the stator including
   a first section having two corresponding electrodes which apply a signal to said first section, and
   a second section, uniformly configured to said first section, having an opening adjacent to said first section and having projections;
   a moving element in contact with said second section and driven by progressive oscillation waves generated in said second section due to the signal applied to said electrodes; and
   a support member, having a portion inserted into said opening, which supports said stator.

15. The motor as claimed in claim 14, wherein said material is a piezoelectric material and the signal represents a polarization process.

16. The motor as claimed in claim 14, further comprising ditches formed by said projections, which are different from said opening.

17. The motor as claimed in claim 14, wherein said stator has a circular configuration with a plurality of first sections and a plurality of second sections, said plurality of first sections being adjacent to each other and said plurality of second sections being adjacent to each other, with said electrodes placed on the inner and outer circumferences, respectively, of said stator, said electrode on the inner circumference of said stator being a shared electrode of said plurality of first sections and said electrode placed on the outer circumference of said stator being electrodes individually related to said corresponding first sections.

18. The motor as claimed in claim 14 wherein said stator comprises a plurality of said first sections and a plurality of said second sections, said plurality of first sections being adjacent to each other and said plurality of second sections being adjacent to each other;
   one of said electrodes are electrodes individually related to said corresponding first sections and the other of said electrodes is a shared electrode of said plurality of first sections; and
   said individually related electrodes have four electrodes corresponding to one wave length of the progressive oscillation waves.

19. The motor as claimed in claim 14, wherein said stator comprises a plurality of said first sections and a plurality of said second sections, said plurality of first sections being adjacent to each other and said plurality of second sections being adjacent to each other;
   one of said electrodes are electrodes individually related to said corresponding first sections and the other of said electrodes is a shared electrode of said plurality of first sections; and
   said individually related electrodes having two electrodes corresponding to one wave length of the progressive oscillation waves.

20. The motor as claimed in claim 14 wherein said stator comprises a plurality of said first sections and a plurality of said second sections, said plurality of first sections being adjacent to each other and said plurality of second sections being adjacent to each other;
   one of said electrodes are electrodes individually related to said corresponding first sections and the other of said electrodes is a shared electrode of said plurality of first sections; and
   an integer number of said individually related electrodes correspond to one wave length of the progressive oscillation waves.

* * * * *

UNITED STATES PATENT AND TRADEMARK OFFICE
CERTIFICATE OF CORRECTION

PATENT NO. :     5,451,827

DATED :     September 19, 1995

INVENTOR(S) :     Tadao TAKAGI

It is certified that error appears in the above-indentified patent and that said Letters Patent is hereby corrected as shown below:

Title Page, Column 2, FOREIGN PATENT DOCUMENTS, "022672" should be --0222672---

Signed and Sealed this

Twenty-first Day of May, 1996

Attest:

BRUCE LEHMAN

*Attesting Officer*      *Commissioner of Patents and Trademarks*